United States Patent [19]

Yamada

[11] Patent Number: 5,150,402
[45] Date of Patent: Sep. 22, 1992

[54] ISDN TERMINAL HAVING DIAGNOSTIC FUNCTION

[75] Inventor: Masayuki Yamada, Tokyo, Japan
[73] Assignee: NEC Corporation, Tokyo, Japan
[21] Appl. No.: 757,805
[22] Filed: Sep. 11, 1991
[30] Foreign Application Priority Data Sep. 12, 1990 [JP] Japan .................................. 2-239954

[51] Int. Cl.[5] ..................... H04M 3/42; H04M 11/00; H04M 9/00
[52] U.S. Cl. ...................................... 379/93; 379/442; 379/105
[58] Field of Search ...................... 379/28, 93, 90, 442, 379/102, 105

[56] References Cited

U.S. PATENT DOCUMENTS 4,995,109  2/1991  Arizumi et al. ................... 379/93 X Primary Examiner—Stafford D. Schreyer
Attorney, Agent, or Firm—Foley & Lardner

[57] ABSTRACT

An ISDN terminal adapter having a diagnostic function includes a terminal adapter section, an S/T pointer interface section, a D channel control section, a sub-address identifying section, and a remote monitor section. The terminal adapter section has a data rate converting function for communication with a terminal of a distant station connected to an ISDN. The S/T point interface section converts an output signal from the terminal adapter section into a protocol of the ISDN. The D channel control section receives D channel information from the distant station through the S/T point interface section and extracts a sub-address from the D channel information. The sub-address identifying section determines whether the sub-address of the D channel information input from the D channel control section coincides with a predetermined code. The remote monitor section sets a remote monitor state in response to a control signal generated in accordance with the determination result from the sub-address identifying section.

3 Claims, 2 Drawing Sheets

ISDN TERMINAL HAVING DIAGNOSTIC FUNCTION

BACKGROUND OF THE INVENTION

The present invention relates to a terminal adapter for connecting a non-ISDN standard terminal to an ISDN and, more particularly, to an ISDN terminal adapter having a diagnostic function.

A conventional terminal adapter for connecting a non-ISDN standard terminal to an ISDN can perform normal data communication with a terminal adapter for a terminal in the service area of a distant station. In addition, the conventional terminal adapter has a self-diagnostic function to, for example, read out and change/set optional functions. However, the adapter does not have a diagnostic function with respect to a terminal adapter for a terminal in a distant station at a remote place. For this reason, when an optional function of a terminal adapter in a distant station is to be changed to perform data communication with a terminal in the distant station, the terminal adapter must be directly operated by an operator to change the optional function.

The conventional terminal adapter does not have a diagnostic function allowing reading and changing/setting operations of option setting information of a terminal adapter for a terminal in a distant station, with which communication is to be performed, from a remote place. For this reason, when these operations are to be performed, the terminal adapter in the distant station must be directly operated by an operator. If, therefore, a terminal adapter of a distant station is unmanned, reading and changing/setting operations of option setting information cannot be performed.

SUMMARY OF THE INVENTION

It is an object of the present invention to provide an ISDN terminal adapter having a diagnostic function, which can perform automatic diagnosis such as reading and changing/setting operations of option setting information from a remote place.

It is another object of the present invention to provide an ISDN terminal adapter having a diagnostic function, which can perform automatic diagnosis even if a terminal adapter of a distant station is unmanned.

In order to achieve the above objects, according to the present invention, there is provided an ISDN terminal adapter having a diagnostic function, comprising a terminal adapter section having a data rate converting function for communication with a terminal of a distant station connected to an ISDN, an S/T point interface section for converting an output signal from the terminal adapter section into a protocol of the ISDN, a D channel control section for receiving D channel information from the distant station through the S/T point interface section and extracting a sub-address from the D channel information, a sub-address identifying section for determining whether the sub-address of the D channel information input from the D channel control section coincides with a predetermined code, and a remote monitor section for setting a remote monitor state in response to a control signal generated in accordance with the determination result from the sub-address identifying section.

DESCRIPTION OF THE PREFERRED EMBODIMENT

The present invention will be described below with reference to the accompanying drawings.

Figure 1:
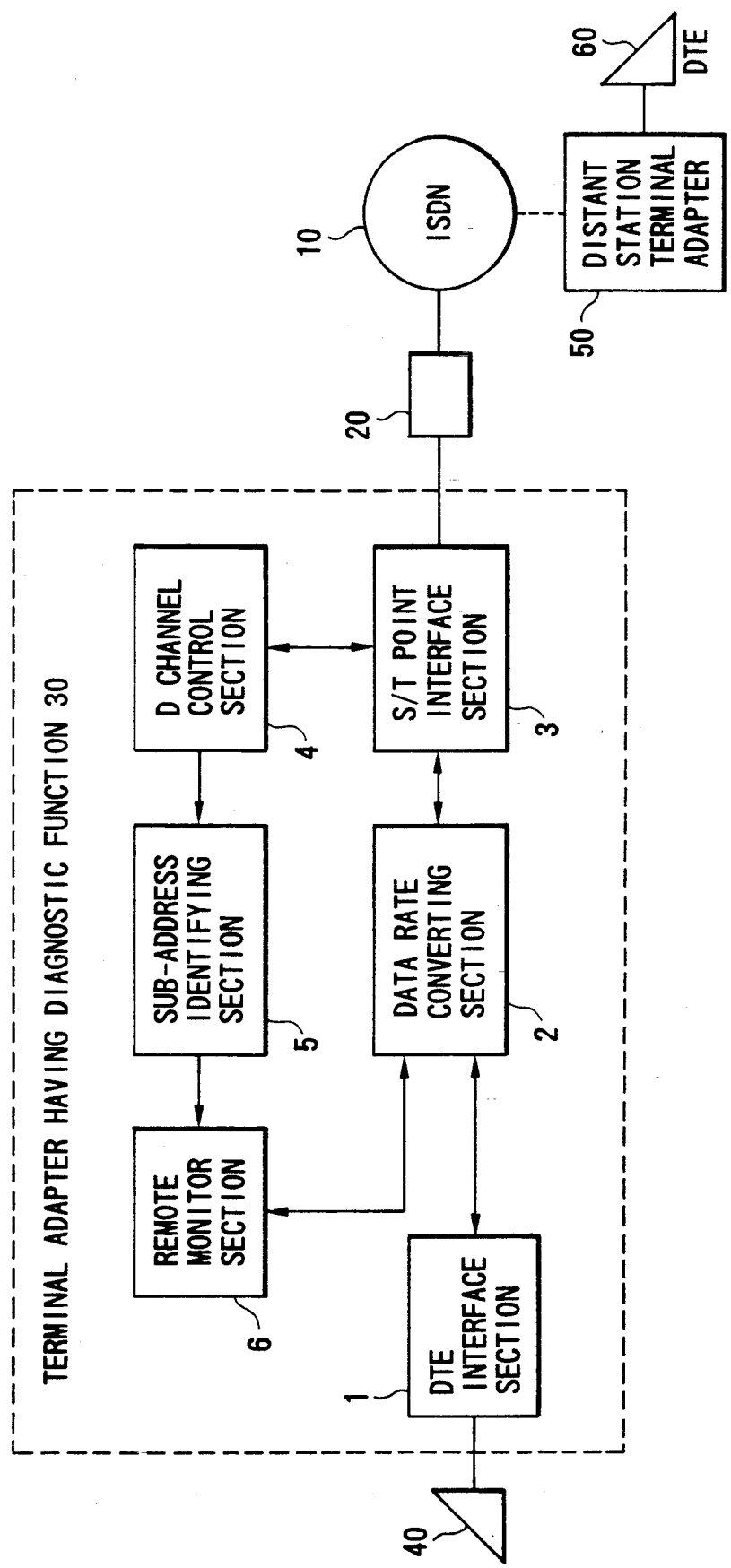
FIG. 1 is a block diagram showing an ISDN terminal adapter having a diagnostic function according to an embodiment of the present invention.

FIG. 1 is a block diagram showing an ISDN terminal adapter having a diagnostic function according to an embodiment of the present invention. Referring to FIG. 1, reference numeral 10 denotes an ISDN; 20, a network terminating unit (to be referred to as an NT hereinafter) connected to an ISDN line; 30, an intra-office terminal adapter having a diagnostic function (to be referred to as an intra-office terminal adapter hereinafter) set in the service area of the ISDN 10 through the NT 20; 40, an intra-office terminal (to be referred to as a DTE hereinafter); 50, a distant station terminal adapter having a diagnostic function (to be referred to as a distant station terminal adapter hereinafter), which is in the service area of the ISDN 10 and has the same arrangement as that of the intra-office terminal adapter 30; and 60, a distant station DTE.

Figure 2:
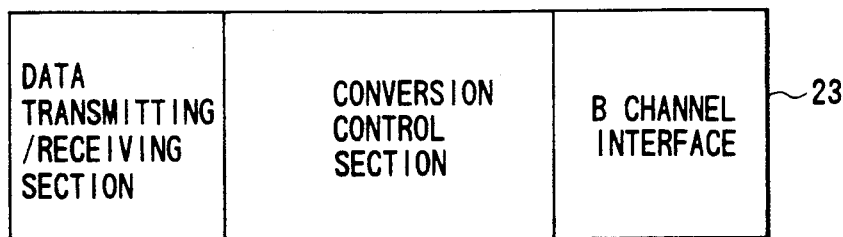
FIGS. 2 to 6 are block diagrams showing the detailed arrangements of the respective components in FIG. 1.

The intra-office terminal adapter 30 comprises a DTE interface section 1, a data rate converting section 2, an S/T point interface section 3, a D channel control section 4, a sub-address identifying section 5, and a remote monitor section 6. The DTE interface section 1 electrically performs level conversion of transmission data from the DTE 40 and reception data to the DTE 40. The data rate converting section 2 converts the data rate, at which data is transmitted from the DTE 40, into 64 Kbps and outputs data to the S/T point interface section 3, and converts a 64-Kbps signal transmitted from the S/T point interface section 3 into a DTE-rate signal and outputs it to the DTE interface section 1. The S/T point interface section 3 performs time-division multiplex of D channel information from the D channel control section 4 and B channel information from the data rate converting section 2 to form an ISDN frame format, and transmits it to the NT 20 (layer 1). In addition, the S/T point interface section 3 receives data from the NT 20 and distributes D channel information and B channel information to the D channel control section 4 and the data rate converting section 2, respectively. The D channel control section 4 receives D channel information from the S/T point interface section 3 to perform call control processing. In addition, upon reception of an incoming call, the D channel control section 4 extracts a reception sub-address as layer 3 information of the D channel and outputs it to the sub-address identifying section 5. The sub-address identifying section 5 stores a predetermined code and compares the code with the sub-address received from the D channel control section 4 upon reception of the incoming call. If they coincide with each other, the sub-address identifying section 5 sends a control signal to the remote monitor section 6 to start it. Upon reception of the control signal from the sub-address identifying section 5, the remote monitor section 6 is started to read out predetermined option setting information, received from a distant station, from the data rate converting section 2 or to output a current option setting value as B channel data to the data rate converting section 2 in response to a change request command FIGS. 2 to 6 are block diagrams showing the detailed arrangements of the data rate converting section 2, the S/T point interface section 3, the D channel control section 4, the sub-address identifying section 5, and the remote monitor section 6. As shown in FIG. 2, the data rate converting section 2 is constituted by a data transmitting/receiving section 21, a conversion control section 22, and a B channel interface 23. The data rate converting section 2 performs data rate conversion of data from the DTE 40 in accordance with CCITT recommendation V. 110 and outputs B channel data. In contrast to this, the section 2 converts B channel data into DTE-rate data and outputs it to the DTE interface section 1.

Figure 3:
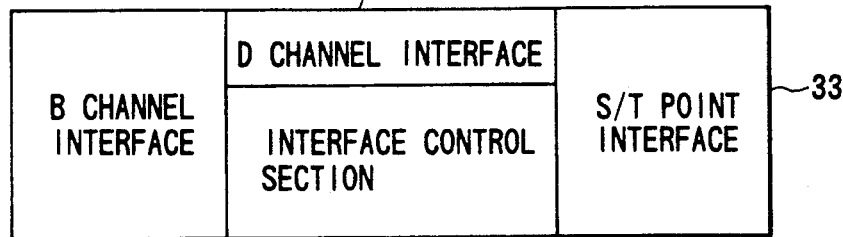

The S/T point interface section 3 is constituted by a B channel interface 31, a D channel interface 32, an S/T point interface 33, and an interface control section 34, as shown in FIG. 3. The S/T point interface section 3 performs time-division multiplex of B channel data and D channel data in accordance with CCITT recommendation I. 430 and supplies the resulting data to the S/T point interface. In contrast to this, the section 3 demultiplexes/outputs B channel data and D channel data from the S/T point interface.

Figure 4:
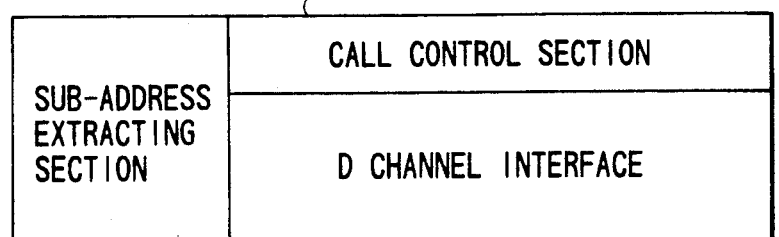

As shown in FIG. 4, the D channel control section 4 is constituted by a sub-address extracting section 41, a call control section 42, and D channel interface 43. The D channel control section 4 performs call control with respect to D channel data in accordance with CCITT recommendation Q. 921,931. In addition, upon reception of an incoming call, the section 4 extracts a reception sub-address from D channel data and outputs it to the sub-address identifying section 5.

Figure 5:
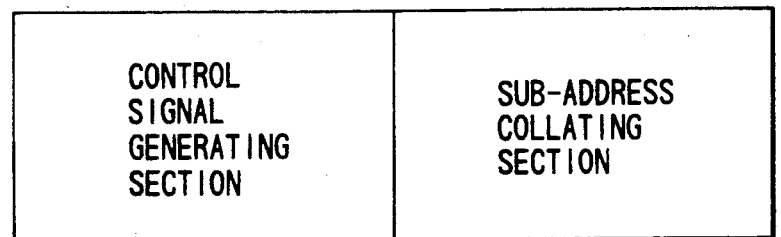

As shown in FIG. 5, the sub-address identifying section 5 is constituted by a control signal generating section 51, and a sub-address collating section 52. The sub-address identifying section 5 compares a sub-address input from the D channel with a predetermined code. If they coincide with each other, the section 5 outputs a control signal to the remote monitor section 6.

Figure 6:
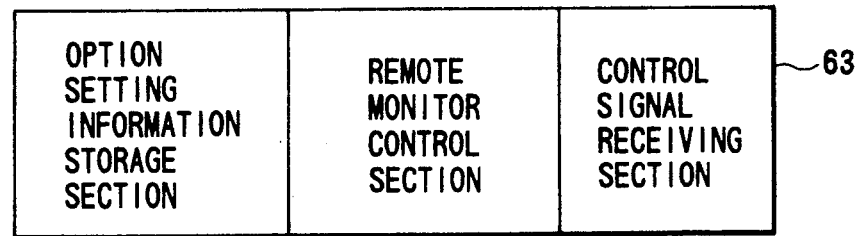

The remote monitor section 6 is constituted by an option setting information storage section 61, a remote monitor control section 62, and a control signal receiving section 63, as shown in FIG. 6. When the remote monitor section 6 receives a control signal from the sub-address identifying section 5, the remote monitor control section 62 is started. The remote monitor control section 62 receives B channel information from the distant station through the data rate converting section 2. Upon reception of a predetermined command, the remote monitor control section 62 accesses the option setting information storage section 61, and reads out parameters to change them. The read parameters are transmitted, as B channel information, to the distant station through the data rate converting section 2.

An operation of the ISDN terminal adapter having the diagnostic function, which has the above-described arrangement, according to the present invention will be described below. Note that in this embodiment, an outgoing call is output from the DTE 60 of the distant station in a remote place to the intra-office terminal 40, and option information set in the intra-office terminal adapter 30 is read out and changed/set.

When an outgoing call is output from the distant station DTE 60 to the intra-office terminal adapter 30 through the distant station terminal adapter 50 having the same function as that of the intra-office terminal adapter, ISDN D channel data is transmitted to the D channel control section 4 through the S/T point interface section 3. The D channel control section 4 extracts a reception sub-address from the input D channel data, and outputs it to the sub-address identifying section 5.

The sub-address identifying section 5 checks whether the input sub-address coincides with a predetermined code. If they coincide with each other, the section 5 outputs a control signal to the remote monitor section 6 to start it. Upon reception of the control signal from the sub-address identifying section 5, the remote monitor section 6 sets the intra-office terminal adapter 30 in a remote monitor state.

In this case, the ISDN D channel data is output from the distant station DTE 60 through the distant station terminal adapter 50, reaches the intra-office terminal adapter 30 through the ISDN 10 and the NT 20, and then reaches the D channel control section 4 through the S/T point interface section 3 in the intra-office terminal adapter 30. Subsequently, a sub-address is extracted from the D channel data by the D channel control section 4. If the sub-address identifying section 5 determines that the sub-address coincides with a predetermined code, a control signal is supplied to the remote monitor section 6 to start it, as described above.

When the remote monitor section 6 is started by the control signal from the sub-address identifying section 5 in this manner, a command associated with option setting, which is transmitted from the distant station, is input, as ISDN B channel data, to the intra-office terminal adapter 30. Furthermore, the command is supplied to the data rate converting section through the S/T point interface section 3. After data rate conversion of the command is performed by the data rate converting section 2, the resulting command is supplied to the remote monitor section 6.

The remote monitor section 6 performs reading and changing/setting operations of option setting information on the basis of the command associated with option setting, and transmits the resulting response signal to the distant station terminal adapter 50. This response signal is supplied from the remote monitor section 6 to the data rate converting section 2. After data rate conversion of the signal is performed by the section 2, the resulting signal is transmitted, as ISDN B channel data, to the distant station terminal adapter 50 through the S/T point interface section 3.

As described above, according to the present invention, when current option setting information of a distant station terminal adapter set in a remote place, with which communication is to be performed, is to be read out and changed, the distant station terminal adapter is changed from a normal data communication state to a remote monitor state by using a sub-address generated when an outgoing call is output to a terminal connected to the distant station terminal adapter. Therefore, the option setting information can be read out from the remote place and can be changed without any manual operation at the distant station terminal adapter.

What is claimed is:

1. An ISDN terminal adapter having a diagnostic function, comprising:
   a terminal adapter section having a data rate converting function for communication with an office terminal of a distant station connected to an ISDN;

an S/T point interface section for converting an output signal from said terminal adapter section into protocol of said ISDN;

a D channel control section for receiving D channel information from the distant station through said S/T point interface section and extracting a sub-address from the D channel information;

a sub-address identifying section for determining whether the sub-address of the D channel information input from said D channel control section coincides with a predetermined code; and a remote monitor section for setting a remote monitor state in response to a control signal generated in accordance with the determination result from said sub-address identifying section.

2. An adapter according to claim 1, wherein said distant station terminal is connected to said ISDN through a distant station terminal adapter having the same function as that of said ISDN terminal adapter.

3. An adapter according to claim 1, wherein said remote monitor section sets the remote monitor state and subsequently performs reading and changing operations of option setting information in accordance with an option setting command input through said S/T point interface section and said terminal adapter section.

* * * * *